US007072298B2

(12) United States Patent
Paul et al.

(10) Patent No.: US 7,072,298 B2
(45) Date of Patent: Jul. 4, 2006

(54) METHOD AND APPARATUS FOR RENDERING A CELL-BASED SWITCH USEFUL FOR FRAME BASED PROTOCOLS

(75) Inventors: Harry V. Paul, Haddonfield, NJ (US); Henry O. Gonzalez, Belle Mead, NJ (US); Larry Cantwell, Moorestown, NJ (US)

(73) Assignee: Computer Network Technology Corporation, Minneapolis, MN (US)

( * ) Notice: Subject to any disclaimer, the term of this patent is extended or adjusted under 35 U.S.C. 154(b) by 173 days.

(21) Appl. No.: 10/873,550

(22) Filed: Jun. 21, 2004

(65) Prior Publication Data

US 2005/0041659 A1    Feb. 24, 2005

Related U.S. Application Data

(63) Continuation-in-part of application No. 09/995,605, filed on Nov. 29, 2001.

(60) Provisional application No. 60/297,454, filed on Jun. 13, 2001.

(51) Int. Cl.
*G06F 11/00* (2006.01)
*H04J 3/16* (2006.01)

(52) U.S. Cl. .................. 370/231; 370/395.1; 370/392; 370/470

(58) Field of Classification Search ................ 370/229, 370/231, 395.1, 236, 389, 392, 422, 429, 370/470, 906
See application file for complete search history.

(56) References Cited

U.S. PATENT DOCUMENTS 4,710,868 A    12/1987    Cocke et al.
5,455,820 A    10/1995    Yamada
5,533,201 A    7/1996     Benton et al.
5,781,549 A    7/1998     Dai
5,844,887 A    12/1998    Oren et al.
5,974,467 A    10/1999    Haddock et al.

(Continued)

FOREIGN PATENT DOCUMENTS

EP    0 856 969 A1    8/1998

(Continued)

OTHER PUBLICATIONS

Gregory L. Frazier & Yuval Tamir, The Design & Implementation of a Multi-Queue Buffer for VLSI Communication Switches, Proceedings of the International Conference on Computer Design, Oct. 1989, pp. 466-471, IEEE, New York, NY.

(Continued)

*Primary Examiner*—Afsar Qureshi
(74) *Attorney, Agent, or Firm*—Beck & Tysver, P.L.L.C.

(57) ABSTRACT

A switch segments variable length frames into cells for transmission over a cell-based switch fabric and handles rate differences between the input data rate and the switch fabric data rate. The fabric handles multiple cell packets by maintaining a switch path until a certain number of cells are transmitted as indicated in a length field in the first data cell. The first cell contains a full data payload, and a length field value sufficient to handle a maximum length frame. Subsequent cells can contain less than a full data payload, with the number of valid bytes in the cell being indicated in the length field. The last cell used to segment the frame contains an end of frame indicator. The indicator signals the destination port side of the switch to terminate the packet path in the switch fabric prematurely—before the number of cells indicated in the first data cell.

21 Claims, 7 Drawing Sheets

U.S. PATENT DOCUMENTS

| | | |
|---|---|---|
| 5,983,260 A | 11/1999 | Hauser et al. |
| 5,999,527 A | 12/1999 | Petersen |
| 6,067,286 A | 5/2000 | Jones et al. |
| 6,160,813 A | 12/2000 | Banks et al. |
| 6,335,992 B1 | 1/2002 | Bala et al. |
| 6,370,145 B1 | 4/2002 | Dally et al. |
| 2002/0156918 A1 | 10/2002 | Valdevit et al. |

FOREIGN PATENT DOCUMENTS

| | | |
|---|---|---|
| EP | 0 959 591 A1 | 11/1999 |
| EP | 1 016 980 A2 | 7/2000 |
| WO | WO 01/67672 A2 | 9/2001 |
| WO | WO 03/017103 A1 | 2/2003 |
| WO | WO 03/017583 A1 | 2/2003 |

OTHER PUBLICATIONS

Kohei Shiomoto, Masayuki Murata, Yuji Oie and Mideo Miyahaha, Performance Evaluation of Cell Bypass Queuing Discipline for Buffered Banyan Type ATM Switches, Proceedings INFOCOM '90, Feb. 25, 2005, pp. 677-685 vol. 2, IEEE, New York, NY.

Erwin P. Rathgeb, Redundancy Concepts for a Large ATM Switching Node, Sep. 21, 1997, XVI World Telecom Congress Proceedings.

Wolfgang Fischer, Oswald Fundneider, Ernst-Heinrich Goeldner & K.A. Lutz, A Scalable ATM Switching System Architecture, IEEE Journal on Selected Areas in Communications, Oct. 1991, pp. 1299-1307, vol. 9, No. 8, New York, NY.

M. Shreedhar & George Varghese, Efficient Fair Queuing Using Deficit Round-Robin, IEEE/ACM Transactions on Networking, Jun. 1996, pp. 375-385, vol. 4, No. 3.

Providing Reliable, High-Speed Operations in Large Sans, 2002 Brocade Communications Systems, Inc., Mar. 2002.

Kenneth Y. Yun, A Terabit Multiservice Switch, IEEE Micro, Jan.-Feb. 2001, pp. 58-70.

Packet Switch Chips, Feb. 2, 2003, www.lightreading.com/document.asp?doc_id=25989&print=true, Downloaded Feb. 16, 2005.

The Virtual Output Queue, http://ipoint.vlsi.uiuc.edu/abr/virtqueue.html, Downloaded Feb. 16, 2005.

Applied Micro Circuits Corporation, Cyclone (nPX8005) Switch Fabric, https://www.amcc.com/cardiff/docManagement/displayProduct Summary.jsp?prodid=nPX8005, Downloaded Feb. 16, 2005.

METHOD AND APPARATUS FOR RENDERING A CELL-BASED SWITCH USEFUL FOR FRAME BASED PROTOCOLS

RELATED APPLICATIONS

This application is a continuation-in-part application based on U.S. patent application Ser. No. 09/995,605, entitled "Method and Apparatus for Rendering a Cell-Based Switch Useful for Frame Based Application Protocols," filed Nov. 29, 2001, which is hereby incorporated by reference and which claims the benefit of U.S. provisional application No. 60/297,454, filed Jun. 13, 2001.

This application is related to U.S. patent application entitled "Fibre Channel Switch," Ser. No. 10/873,532, filed on Jun. 21, 2004. This related application is hereby incorporated by reference.

FIELD OF THE INVENTION

The present invention relates generally to products and methods that are capable of reducing latency in switches. More particularly, it relates to a method and system for reducing latency and handling data rate differences in cell-based switch fabrics adapted for use with Fibre Channel or other frame-based protocols.

BACKGROUND OF THE INVENTION

Fibre Channel is a switched communications protocol that allows concurrent communication among servers, workstations, storage devices, peripherals, and other computing devices. Fibre Channel can be considered a channel-network hybrid, containing enough network features to provide the needed connectivity, distance, and protocol multiplexing, and enough channel features to retain simplicity, repeatable performance, and reliable delivery. Fibre Channel is capable of full-duplex transmission of frames at rates extending from 1 Gbps (gigabits per second) to 10 Gbps. It is also able to transport commands and data according to existing protocols such as Internet protocol (IP), Small Computer System Interface (SCSI), High Performance Parallel Interface (HIPPI) and Intelligent Peripheral Interface (IPI) over both optical fiber and copper cable.

Figure 1:
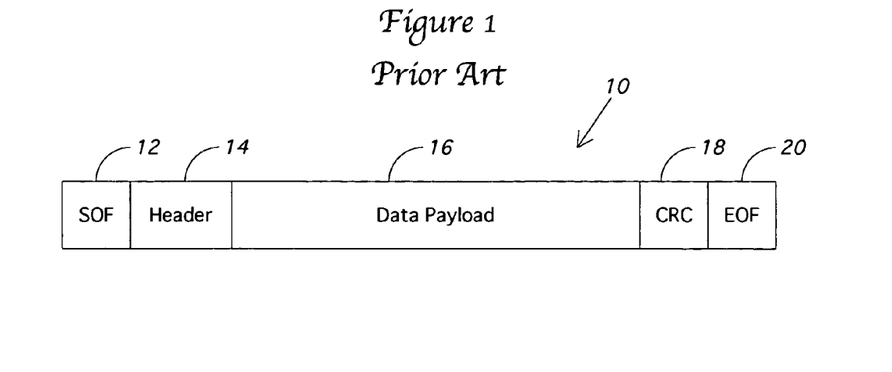
FIG. 1 is a block drawing showing a variable-length Fibre Channel frame.

FIG. 1 illustrates a variable-length Fibre Channel frame 10. The frame 10 has a 4-byte start-of-frame (SOF) indicator 12, which is a particular binary sequence indicative of the beginning of the frame 10. The SOF indicator 12 is followed by a 24-byte header 14, which specifies, among other things, the frame source address and the frame destination address. A variable-length data field 16 follows the header 14, which can range from 0 to 2112 bytes in length. The data field 16 is followed by a 4-byte cyclical redundancy check (CRC) code 18 for error detection, and by a 4 byte end-of-frame (EOF) indicator 20. Since the data payload 16 of a Fibre Channel frame can vary between 0 and 2112 bytes, the total length of a Fibre Channel frame 10 can vary from 36 to 2148 bytes.

Figure 2:
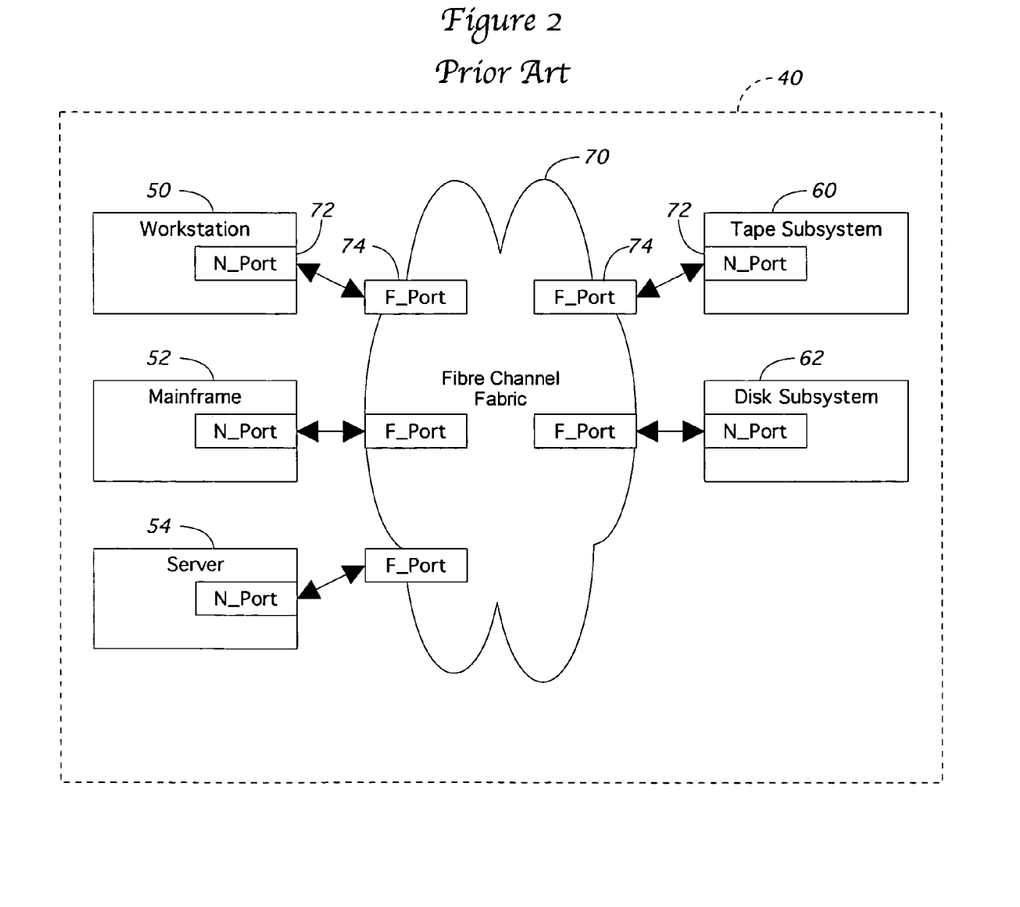
FIG. 2 is a block diagram of a representative Fibre Channel fabric connecting a plurality of computers and storage subsystems.

FIG. 2 illustrates a block diagram of a representative Fibre Channel network 40. A workstation 50, a mainframe 52, and a server 54 are interconnected with a tape subsystem 60 and a disk subsystem 62 via a Fibre Channel fabric 70. The Fibre Channel fabric 70 generally takes the form of one or more Fibre Channel switches. The purpose of the fabric 70 is to interconnect the various node-ports (N_ports) 72 associated with the computers 50–54 and storage subsystems 60–62. This is accomplished by attaching the N_ports 72 to fabric-ports (F_ports) 74 associated with the fabric/switch 70. The fabric 70 receives frames of data from a source port and routes the frames to a destination port using the source and destination information found within the Fibre Channel frame header 14.

Switch fabrics 70 that support protocols such as Fibre Channel are generally frame-based and allow variable length frames to be switched from one port to another. However, there are also techniques that use fixed length cells to switch variable length frames, such as that described for example in U.S. Pat. No. 5,781,549. When using fixed length cells for data transmission, the cell size is kept relatively small. In the Ethernet switch described in the '549 patent, for example, variable length Ethernet frames are segmented into 60 bit cells for transmission through the switch. This segmentation is performed by a packet processing unit that is responsible for a group of eight Ethernet ports. Each cell contains a cell header, which contains a packet data byte count and a cell type. The packet data byte count indicates the number of valid data bytes found within the cell. The cell type indicates the type of data found within the cells. There are two cell types that indicate the cell contains actual Ethernet payload data. The first type indicates that the cell does not contain the end of the Ethernet frame. The second type indicates that the cell is the last cell in the Ethernet frame.

The cells are transmitted to Ethernet ports managed by other packet processing units over a shared cell bus. A request to transmit a cell over the cell bus is made by the packet processing unit to a central routing controller. This controller arbitrates competing requests for the shared bus, and grants access to the bus through an acknowledgement signal sent to the selected packet processing unit. Once granted access to the bus, the packet processing unit transmits its data cells over the cell bus. Other packet processing units monitor traffic on the cell bus for cells destined for one of their ports. When cells are discovered, they are reassembled back into Ethernet packets and transmitted out the appropriate Ethernet port.

The Ethernet switch in the '549 patent did not describe the use of a true cell-based switch, since the shared bus configuration meant it was not possible to simultaneously route a plurality of cells between different pairs of source and destination ports. However, true cell-based switches, such as ATM switches, use crossbars that are well known in the prior art. These switches simultaneously route multiple cells through the switch between different pairs of source and destination ports.

Because of the efficiency of these cell-based switches, several vendors have proposed the use of cell-based switches to switch data packets or frames of variable lengths. Like the '549 patent, these proposals segment the frames into fixed-size cells and then transmit the cells through the cell-based switch. Such methods typically require that the number of cells in the packet be known before the packet is sent. That number is placed in the header of every cell in the packet. The cell-based switch uses this information to break the connection through the fabric once the packet transmission has been completed.

Some framing formats indicate the frame length in their header, as is the case with IEEE 802.3 frames. When the beginning of one of these frames enters the switch, the switch can read the header, find the length of the frame in bytes, and calculate the number of cells that will transport the frame. In this case, the process of segmenting the frame into cells can begin almost immediately, with the cell header containing the proper count of cells in the packet length field. This allows the frame to be transmitted through the cell-based switch with a minimum of latency.

The use of cell-based switches to switch Fibre Channel frames 10 is more difficult, since Fibre Channel headers 14 do not contain any information identifying the length of the frame 10. This means that the length of a Fibre Channel frame 10 is not known until the CRC value 18 and the EOF marker 20 are received. It is possible to buffer an entire Fibre Channel frame 10 and count the total number of bytes in the frame. It would then be a simple matter to calculate how many cells will be necessary to accommodate all of the information in the Fibre Channel frame 10, and then place this value in the cell headers. However, waiting for the entire frame to be buffered before sending the beginning of the frame over the cell-based switch fabric introduces unacceptable latency into the transmission time of the frame (about 20 microseconds at 1 Gbps data rate versus a preferred maximum latency of two microseconds).

What is needed is a method to transmit variable length frames that do not contain length information in their frame header over a cell-based switch fabric without introducing an unacceptable level of latency.

SUMMARY OF THE INVENTION

To meet this need, a system and method is provided that allows Fibre Channel frames to be segmented into cells for transmission over a cell-based switch without requiring the buffering of the entire frame. This is accomplished by buffering only enough data from the Fibre Channel frame to fill a first data cell. The data cell includes a length of packet field in the header to indicate the number of cells in a packet. In this first data cell, the length of packet field contains a number that is large enough to allow the transmission of a maximum length frame through the cell-based switch fabric.

Data for subsequent cells is accumulated similarly, but it is not necessary to fill the enter data payload of these subsequent cells. Rather, when a cell is to be submitted to the cell-based switch fabric, a partially filled cell is provided. This partially filled cell contains a valid byte count indicating the number of valid data bytes in the data payload. This valid byte count is located in the length of packet cell header field. When these subsequent cells are received at the destination port, only the valid data bytes in the data payload are used to reconstruct the Fibre Channel frame, with the fill bytes being discarded. By allowing partially filled data payloads in the cells, the present invention is able to seamlessly convert between the transmission rate of the data received over the incoming Fibre Channel port and the data rate of the cell-based switch.

When the end of frame indicator is received at the input port, the final cell in the packet is created for submission over the cell-based switch fabric. This cell may contain only a partially filled data payload, and therefore the valid data bytes are provided in the length of packet field. This final cell also includes an end of packet indicator or flag that is set to indicate to the destination port that this cell contains the last data for the Fibre Channel frame. When the destination port receives a cell with this flag set, it will complete the reconstruction of the Fibre Channel frame. Furthermore, the destination port can then indicate to the cell-based switch that the connection that was being held open for this packet can be terminated. This signal can be sent through a variety of techniques, including setting a register bit, connecting a pin to ground, or some other intentional act.

In an alternative configuration, the end of packet information and the valid byte count fields are placed in predetermined locations in the data payload of the cells. Placing this information at the end of the data payload allows the Fibre Channel frame to be immediately segmented into cells without any buffering at the input side of the switch. Some buffering is still required at the destination port side of the switch during the reconstruction of the Fibre Channel frame.

DETAILED DESCRIPTION OF THE INVENTION

Switch Overview

Figure 3:
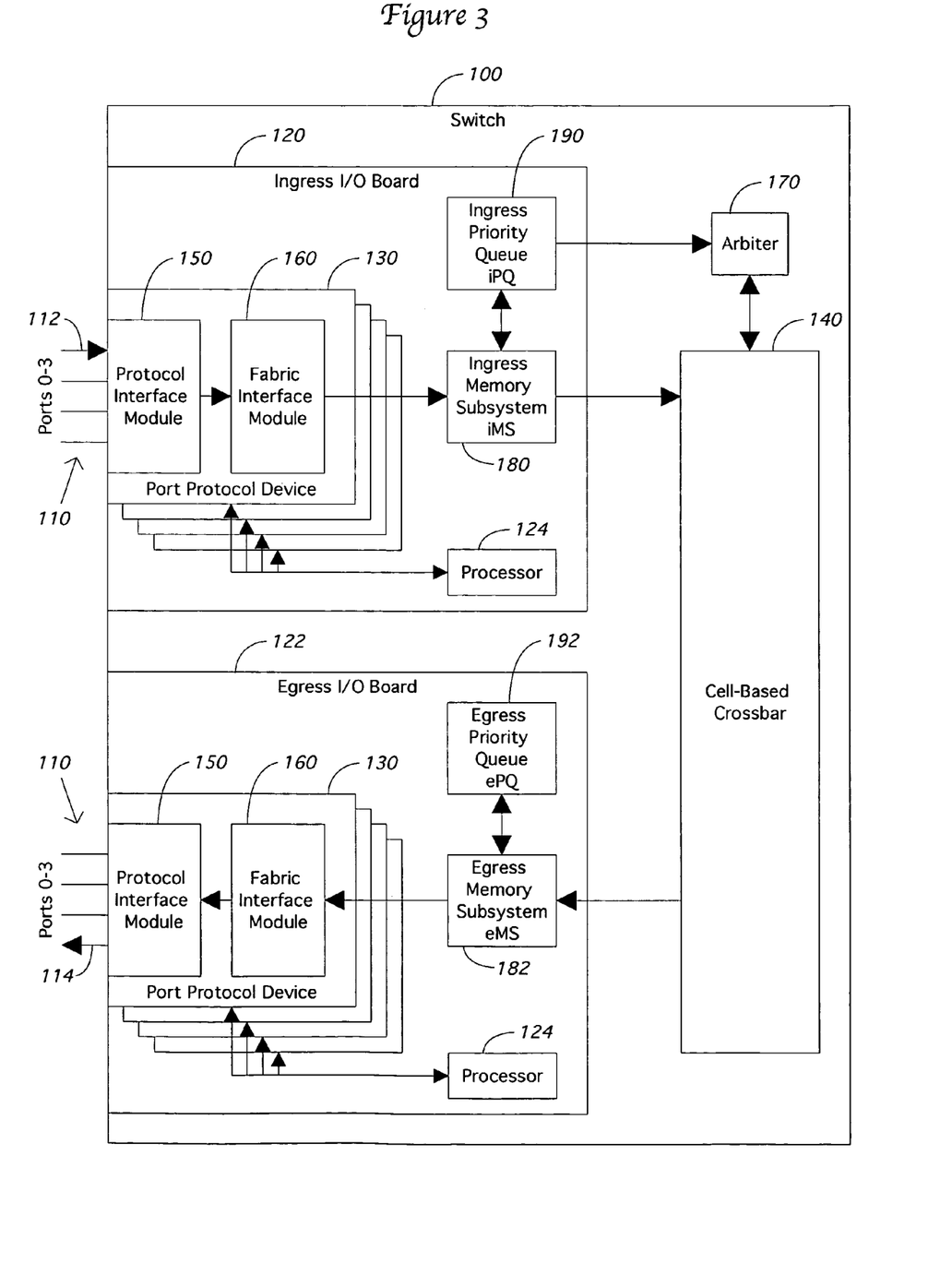
FIG. 3 is a block drawing of one possible Fibre Channel switch in which the present invention can be utilized.

The present invention is best understood after examining the major components of a Fibre Channel switch, such as switch 100 shown in FIG. 3. The components shown in FIG. 1 are helpful in understanding the applicant's preferred embodiment, but persons of ordinary skill will understand that the present invention can be incorporated in switches of different construction, configuration, or port counts.

Switch 100 is a director class Fibre Channel switch having a plurality of Fibre Channel ports 110. The ports 110 are physically located on one or more I/O boards inside of switch 100. Although FIG. 3 shows only two I/O boards, namely ingress board 120 and egress board 122, a director class switch 100 would contain eight or more such boards. The preferred embodiment described in the application can contain thirty-two such I/O boards 120, 122. Each board 120, 122 contains a microprocessor 124 that, along with its RAM and flash memory (not shown), is responsible for controlling and monitoring the other components on the boards 120, 122 and for handling communication between the boards 120, 122.

In the preferred embodiment, each board 120, 122 also contains four port protocol devices (or PPDs) 130. These PPDs 130 can take a variety of known forms, including an ASIC, an FPGA, a daughter card, or even a plurality of chips found directly on the boards 120, 122. In the preferred embodiment, the PPDs 130 are ASICs, and can be referred to as the FCP ASICs, since they are primarily designed to handle Fibre Channel protocol data. Each PPD 130 manages and controls four ports 110. This means that each I/O board 120, 122 in the preferred embodiment contains sixteen Fibre Channel ports 110.

The I/O boards 120, 122 are connected to one or more crossbars 140 designed to establish a switched communication path between two ports 110. Although only a single crossbar 140 is shown, the preferred embodiment uses four or more crossbar devices 140 working together. Of particular importance is the fact that crossbar 140 is cell-based, meaning that it is designed to switch small, fixed-size cells of data. This is true even though the overall switch 100 is designed to switch variable length Fibre Channel frames.

The Fibre Channel frames are received on a port, such as input port 112, and are processed by the port protocol device 130 connected to that port 112. The PPD 130 contains two major logical sections, namely a protocol interface module 150 and a fabric interface module 160. The protocol interface module 150 receives Fibre Channel frames from the ports 110 and stores them in temporary buffer memory. The protocol interface module 150 also examines the frame header for its destination ID and determines the appropriate output or egress port 114 for that frame. The frames are then submitted to the fabric interface module 160, which segments the variable-length Fibre Channel frames into fixed-length cells acceptable to crossbar 140.

The fabric interface module 160 then transmits the cells to an ingress memory subsystem (iMS) 180. A single iMS 180 handles all frames received on the I/O board 120, regardless of the port 110 or PPD 130 on which the frame was received.

When the ingress memory subsystem 180 receives the cells that make up a particular Fibre Channel frame, it treats that collection of cells as a variable length packet. The iMS 180 assigns this packet a packet ID (or "PID") that indicates the cell buffer address in the iMS 180 where the packet is stored. The PID and the packet length is then passed on to the ingress Priority Queue (iPQ) 190, which organizes the packets in iMS 180 into one or more queues, and submits those packets to crossbar 140. Before submitting a packet to crossbar 140, the iPQ 190 submits a "bid" to arbiter 170. When the arbiter 170 receives the bid, it configures the appropriate connection through crossbar 140, and then grants access to that connection to the iPQ 190. The packet length is used to ensure that the connection is maintained until the entire packet has been transmitted through the crossbar 140, although the connection can be terminated early as described below.

A single arbiter 170 can manage four different crossbars 140. The arbiter 170 handles multiple simultaneous bids from all iPQs 190 in the switch 100, and can grant multiple simultaneous connections through crossbar 140. The arbiter 170 also handles conflicting bids, ensuring that no output port 114 receives data from more than one input port 112 at a time.

The output or egress memory subsystem (eMS) 182 receives the data cells comprising the packet from the crossbar 140, and passes a packet ID to an egress priority queue (ePQ) 192. The egress priority queue 192 provides scheduling, traffic management, and queuing for communication between egress memory subsystem 182 and the PPD 130 in egress I/O board 122. When directed to do so by the ePQ 192, the eMS 182 transmits the cells comprising the Fibre Channel frame to the egress portion of PPD 130. The fabric interface module 160 then reassembles the data cells and presents the resulting Fibre Channel frame to the protocol interface module 150. The protocol interface module 150 stores the frame in its buffer, and then outputs the frame through output port 114.

Figure 4:
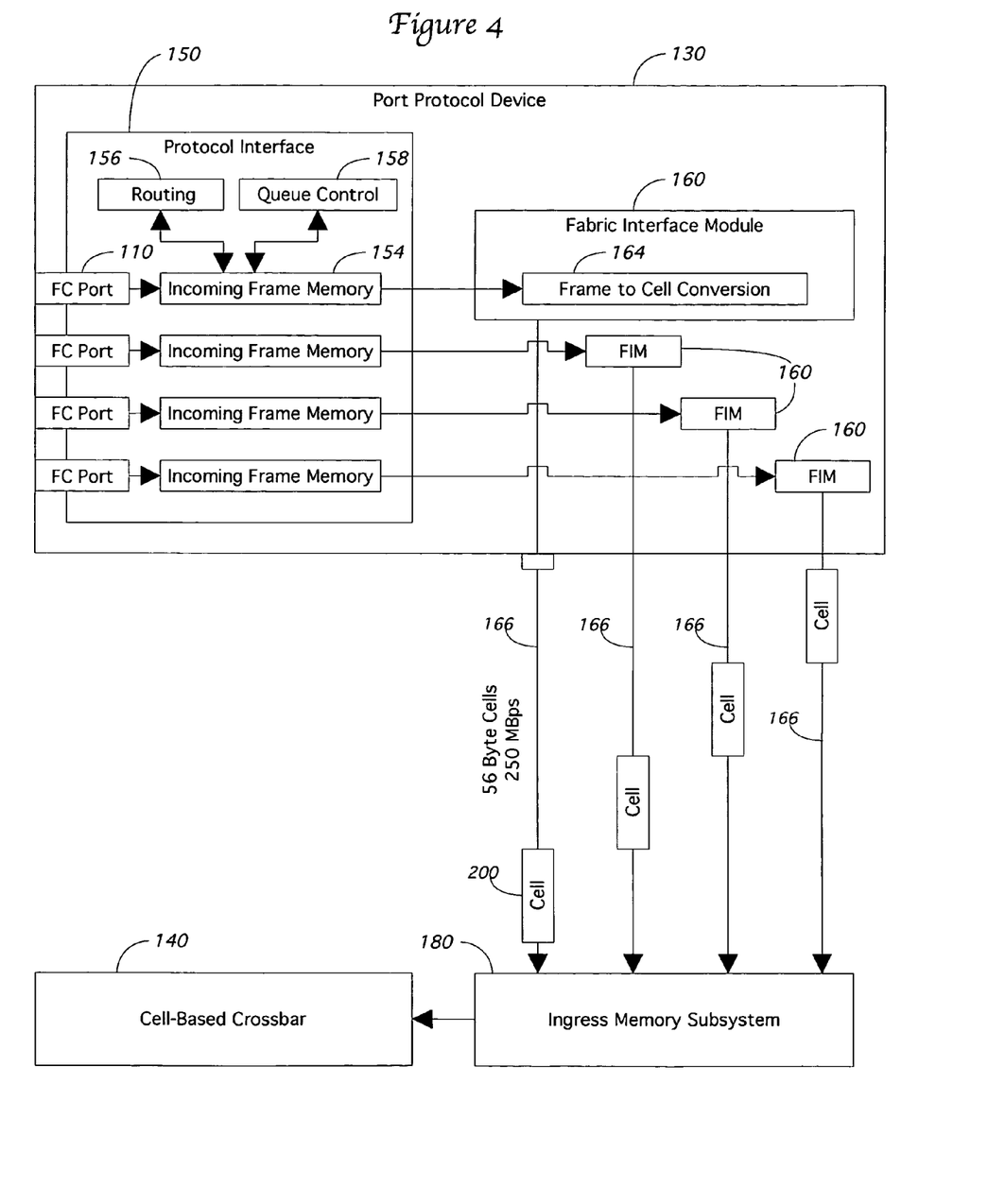
FIG. 4 is a block drawing showing the details of the input port protocol device of the Fibre Channel switch shown in FIG. 3.

In the preferred embodiment, crossbar 140 and the related components are part of a commercially available cell-based switch chipset, such as the nPX8005 or "Cyclone" switch fabric manufactured by Applied Micro Circuits Corporation of San Diego, Calif. More particularly, in the preferred embodiment, the crossbar 140 is the AMCC S8705 Crossbar product, the arbiter 170 is the AMCC S8605 Arbiter, the iPQ 190 and ePQ 192 are AMCC S8505 Priority Queues, and the iMS 180 and eMS 182 are AMCC S8905 Memory Subsystems, all manufactured by Applied Micro Circuits Corporation Port Protocol Device FIG. 4 shows the ingress port protocol device 130 in more detail. As explained above, incoming Fibre Channel frames 10 are received over the ingress port 112 by the protocol interface 150. The incoming frames 10 are stored on an incoming frame buffer memory 154, with each port 110 being allocated either a separate buffer 154 or a separate portion of the buffer 154. This buffer 154 is also known as the credit memory, since the BB_Credit flow control between switch 100 and the upstream device is based upon the size or credits of this memory 154. The routing module 156 examines the destination ID found in the frame header 14 of the frames 10 residing in buffer memory 154. This destination ID is compared to one or more routing tables found within the routing module 156. Based upon this lookup, the routing module 156 is able to determine the appropriate destination port 114 for each frame in buffer 154. One routing module 156 is able to service all Fibre Channel ports 110 on the port protocol device 130.

The queue control module 158 maintains data queues that ensure the in-order delivery of received Fibre Channel frames 10 through switch 100. The queue module 158 is also responsible for implementing procedures to avoid head-of-line blocking. In the preferred embodiment, the queue control module 158 accomplishes these objectives by implementing the deferred queuing technique described in the incorporated Fibre Channel Switch application. A separate queue control module 158 is used for each port 110, and in the preferred embodiment is included as part of a memory controller module that controls each buffer memory 154.

When a Fibre Channel frame 10 is ready to be submitted to the memory subsystem 180 of the ingress I/O board 120, the frame 10 is sent from one of the credit memories 154 of the protocol interface 150 to a fabric interface module 160. The rate of data transfer between the protocol interface device 150 and the fabric interface module 160 in the preferred embodiment is 2.12 Gbps, or 212 MBps. Each FIM 160 is responsible for interfacing with a separate serial data path 166 to the ingress memory subsystem 180. The data transfer rate between each fabric interface module 160 and the iMS 180 in the present invention is 250 MBps. Since the fabric interface module 160 receives data at a rate of 212 MBps, the module 160 must adapt between the two data rates. The rate difference is even greater when data is being received from a 1 Gbps Fibre Channel device and the received data frames are not completely stored in the buffer 154 before transmission to the iMS 180. In the preferred embodiment, it is possible to receive data from Fibre Channel devices over the ports 110 at a variety of rates, include 4 Gbps. In this embodiment, it is necessary for each port 110 to communicate to the iMS 180 over two serial data paths 166, with each path 166 having its own fabric interface module 160. The protocol interface 150 takes responsibility for dividing the traffic between the two FIMs 160 serving that port 110.

Each FIM 160 contains a conversion component 164 that converts the variable-length Fibre Channel frames 10 received from the protocol interface 150 into fixed-sized data cells 200 acceptable to the cell-based crossbar 140 and the iMS 180. Each cell 200 is constructed with a cell header identifying the destination port 114, as identified by routing module 156. The cells 200 are placed sequentially on each of the paths 166 in a round robin matter. FIG. 4 illustrates this round robin nature by placing a gap on each path 166 when other paths 166 contain a data cell 200. In actuality, no significant gap exists between the end of one cell 200 and the beginning of the next cell 200 on a single path 166. It is acceptable to send empty (or "idle") data cells 200 from the port protocol device 130 and the iMS 180 between Fibre Channel frames, but it is not acceptable to send idle cells 200 during the transmission of a Fibre Channel frame. Idle cells 200 are simply ignored by the iMS 180. When the cells leave the egress memory subsystem 182, the conversion component 164 removes cell headers, pad bytes, and idle cells from the data stream and converts the remaining data back into the original Fibre Channel frames.

Frame to Cell Conversion

Figure 5:
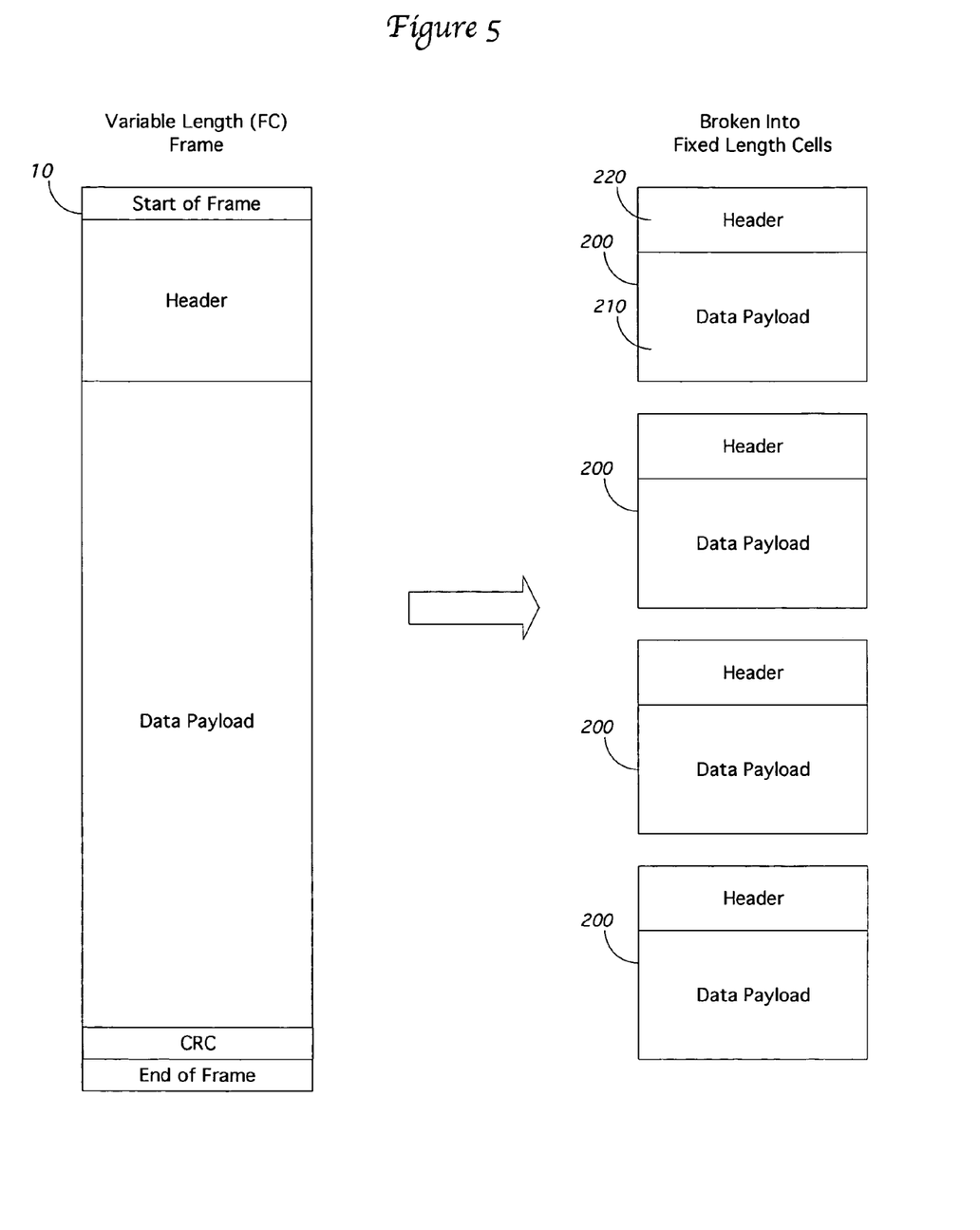
FIG. 5 is a block drawing showing the segmentation of a Fibre Channel frame into fixed length data cells.

The basic functionality of the frame to cell conversion component 164 is shown in FIG. 5. The component 164 converts a variable length Fibre Channel frame 10 into a plurality of fixed-length data cells 200. A Fibre Channel frame can vary between 36 and 2148 bytes in length. In the preferred embodiment, unicast data cells are 64 bytes long. Each data cell 200 has both a data payload component 210 and a header component 220. The preferred embodiment uses a header 220 of 8 bytes, leaving 56 bytes per cell for data in a unicast cell. Multicast data cells 200 are the same size, but have an eleven-byte header component 220. Although this leaves 53 bytes for data in a multicast data cell 200, the preferred embodiment uses only 52 bytes of this data payload 210 in order to simplify logic.

As explained above, the cell-based crossbar 140 and related arbiter 170 maintain a connection through the crossbar 140 throughout the transmission of a data packet. With the AMCC chipset, the maximum packet length is one hundred ninety-two data cells. This means that the data packet using the preferred embodiment components can be up to 10752 bytes long, which is more than enough to handle a maximum sized Fibre Channel frame 10.

Minimizing Latency in a Cell-Based Fibre Channel Switch

As explained above, the biggest hurdle in using a cell-based crossbar 140 for Fibre Channel frames 10 is determining how long the crossbar 140 should hold a connection for a particular frame 10. One alternative is to set the packet length to the maximum size necessary to transmit a Fibre Channel frame 10. Unfortunately, this means that shorter frames 10 will complete their transmission long before the crossbar 140 releases the connection, which greatly decreases the efficiency of the crossbar 140 and the switch 100 in general.

Alternatively, the length of the packet could be set to exactly match the number of cells 200 necessary to transmit each individual Fibre Channel frame 10. Unfortunately, the Fibre Channel protocol does not indicate the length of each frame 10 in the frame header 14. The only way to determine the frame length is to detect the EOF indicator 20. This means that the entire frame would need to be received in the credit memory 154 before the first cell 200 for the frame 10 is constructed and transmitted over the crossbar 140. Unfortunately, the latency caused by this delay is unacceptable in Fibre Channel switches 100.

Early Packet Termination and Rate Adaptation

Figure 6:
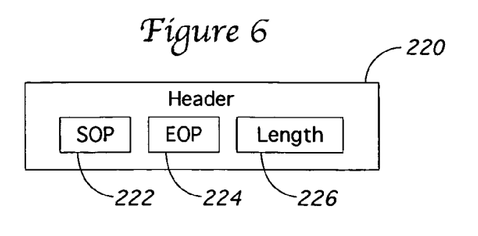
FIG. 6 is a block drawing showing a header of a fixed length data cell.

The present invention overcomes this problem by devising an ability to terminate a packet connection through the crossbar 140 before the entire packet has been transmitted. This is accomplished by adding certain fields to the header of each cell 200. As shown in FIG. 6, the header 220 of a data cell in the preferred embodiment contains numerous fields, including a start of packet (SOP) flag 222, an end of packet (EOP) flag 224, and a packet length field 226. When set, the SOP flag 222 indicates that the current cell 200 contains the start of a new data packet. Similarly, the EOP flag 224 indicates that the cell 200 contains the end of a data packet. The length field 226 is the same field used by prior art cell-based switches to indicate the length of the current packet, in number of cells 200.

Figure 7:
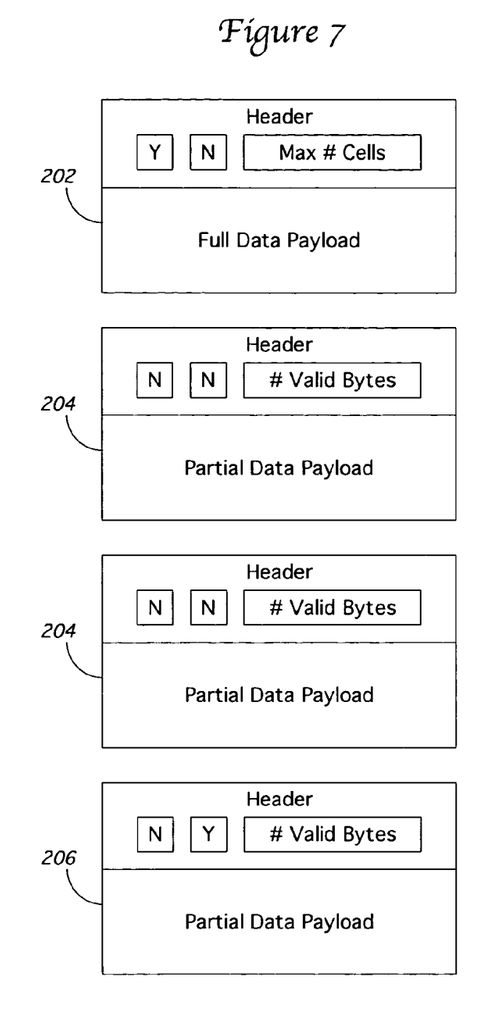
FIG. 7 is a block drawing showing a first data cell, two intermediate data cells, and a last data cell used to transmit a Fibre Channel frame.

FIG. 7 shows how the present invention uses these header fields 222–226 to minimize latency in the switch 100. When a Fibre Channel frame 10 first begins to arrive at the switch 100, it can be immediately forwarded to the fabric interface module 160 for conversion to data cells 200 and transmission through the crossbar 140. The frame to cell conversion component 164 waits until a full payload of data (56 bytes) has arrived, and creates the first data cell 202. The header 220 in this first cell 202 indicates that it is the first cell in a packet by setting the SOP flag 222 and also indicates that it is not the last cell in the packet (the EOP flag 224 is not set). The length field 226 is set to some large number of cells sufficient to send an entire maximum-length Fibre Channel frame 10. While only 39 cells would be necessary to send a maximum sized Fibre Channel frame 10 if every data payload 210 in the cells were completely full, the present invention does not require or expect this to be the case. Hence, the number of cells indicated in the length field 226 of the first data cell 202 is larger than 39,and can be as large as the maximum number of cells 200 allowed in a data packet by the utilized crossbar 140. In the preferred embodiment, no Fibre Channel frame 10 uses more than 79 cells, making this number a good option for length field 226. Alternatively, the length field 226 can vary depending upon the data transfer rate of the Fibre Channel device attached to the incoming port 112 and whether unicast or multicast packets are being sent. In the preferred embodiment, the maximum packet length for 2 Gbps and 4 Gbps devices is 40 cells for unicast packets and 41 cells for multicast packets. The maximum packet length for 1 Gbps devices is 78 cells for unicast packets and 79 cells for multicast packets.

The next two data cells 204 are neither the first nor the last cells 200 in the Fibre Channel frame 10. In these cells 204, neither the SOP flag 222 nor the EOP flag 224 are set. In addition, these cells 204 are allowed to carry a partially full data payload 210. As explained above, cells 200 are transmitted from the fabric interface module 160 to the iMS 180 via a plurality of data lines 166. The data lines 166 are handled sequentially in a round robin format, with a data cell 200 being sent in turn whether data is ready to be sent or not. Under old techniques, it was necessary to fill the data payload of an entire data cell 200 before the cell 200 was submitted to the iMS 180. In contrast, the present invention submits a cell 200 for transmission across the crossbar 140 even when the data payload 210 is not full. The amount of real data in the cell 204 is indicate in the same length field 226 that is used to communicate the length of the packet in the first data cell 202. The egress fabric interface module 162 uses the number of valid bytes indicated in this field 226 in these intermediate cells 204 to add only valid data bytes to the reconstructed Fibre Channel frame 10 and to discard any fill bytes.

When the frame to cell conversion component 164 encounters the EOF indicator 20, it creates a final cell 206 with the EOP flag 224 set. Like the intermediate cells 204, the final cell 206 can be partially filled with valid data, and therefore indicates the number of valid bytes in the cell in the length field 226 of its header 220.

When a cell 200 with the end of packet flag 224 set exits the cell-based crossbar fabric 140, it triggers a release of the connection used by this packet in the crossbar switch 140. The act of releasing the connection can be performed through a variety of techniques, depending on the requirements of the crossbar 140 and arbiter 170. For instance, egress PPD 162 might signal the release of a connection by setting a register bit or sending a signal on a dedicated path (such as by setting a pin to ground).

Filling the data payload 210 of the first data cell 202 contain a full data payload 210 helps to avoid a data underrun at the egress port 114. As long as the first cell 202 contains a full amount of data, the egress PPD 132 is assured of having sufficient data to output the frame data at the same nominal rate that data was input to the switch 100 at input port 112. Filling the first data cell 202 also allows the cell 202 to be transmitted without the need for sending a valid byte count in the cell 202. If the first cell 202 cannot be filled due to a very small Fibre Channel frame, both the SOF flag 222 and the EOF flag 224 will be set, and the length field 226 will indicate the number of valid bytes in the cell 202.

ALTERNATIVE EMBODIMENT

Figure 8:
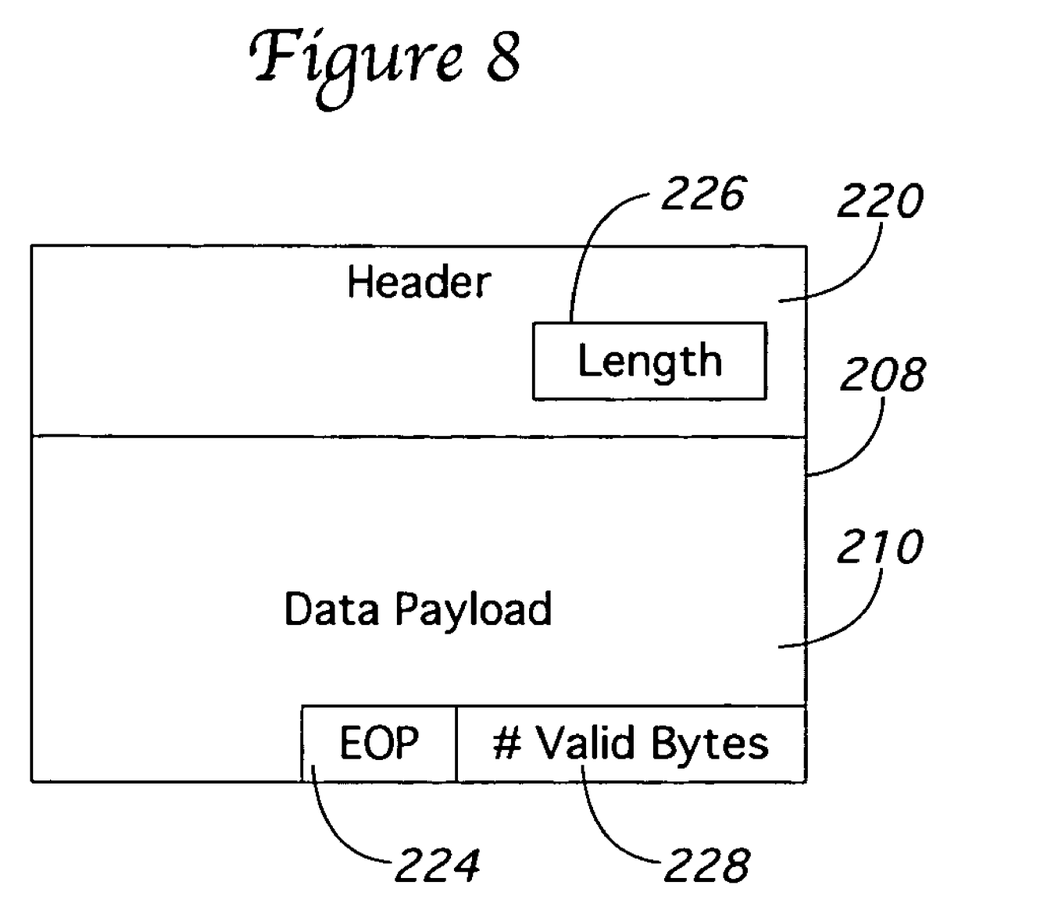
FIG. 8 is a block drawing showing an alternative embodiment for a fixed length data cell.

FIG. 8 shows an alternative embodiment cell 208 in which the header 220 is not used to transmit end of packet information. In this embodiment, the end of packet flag 224 and a valid byte count field 228 are inserted into the data payload 210 of the cell 208. The packet length field 226 remains in the header, and is used to indicate the packet length in number of cells. Fields 224, 228 should occur at the same position within every cell 208. At the switch input, the contents of a cell's EOP 224 and valid byte count fields 228 cannot be calculated until data for an entire cell 208 has been received. If these fields 224, 228 are located at the beginning of the data payload 210, each cell 208 must be buffered at the switch input. After the entire cell 208 has been buffered, the valid byte count 228 and EOP indicator 224 for that cell 208 are calculated and placed in the fields at the beginning of the cell 208. Then the cell is transmitted into the iMS 180 and crossbar 140. At the switch output, the valid byte count 228 and EOP indicator 224 are available at the beginning of the data payload 210, and no output buffering is required.

If the valid byte count 228 and EOP indicator 224 are located at the end of each cell 208, no buffering at the switch input is required. The beginning of the cell 208 is transmitted to the iMS 180 and crossbar 140 as soon as it is available. While the cell 208 is entering the crossbar 140, the valid byte count 228 and EOP indicator 224 for that cell 208 are calculated. As the end of the cell 208 is being submitted to the iMS 180, the valid byte count 228 and EOP indicator 224 are placed in the fields at the end of the cell 208. However, at the switch output, the entire cell 208 must be buffered. After the entire cell 208 has been buffered at the switch output, the valid byte count 228 and EOP indicator 224 are extracted from the fields at the end of the cell 208. Then, the cell's payload data 210 can be extracted.

Segmenting variable-length frames into fixed-length cells with the above early termination procedure results in a latency of one cell, rather than a latency of one frame. If the valid byte count 228 and EOP indicator 224 are in the header 220 or at the beginning of the data payload 210, a one-cell latency at the switch input results. If the valid byte count 228 and EOP indicator 224 are at the end of the data payload 210, a one-cell latency at the switch output results. If the valid byte count 228 and EOP indicator 224 are in the middle of a cell 208, a half-cell latency at the switch input and a half-cell latency at the switch output result. The total latency is always one cell, and the location of the latency is determined by the position of the valid byte count 228 and EOP indicator 224 within the cell. The location of the latency may be chosen to suit any other design criteria.

Method

Figure 9:
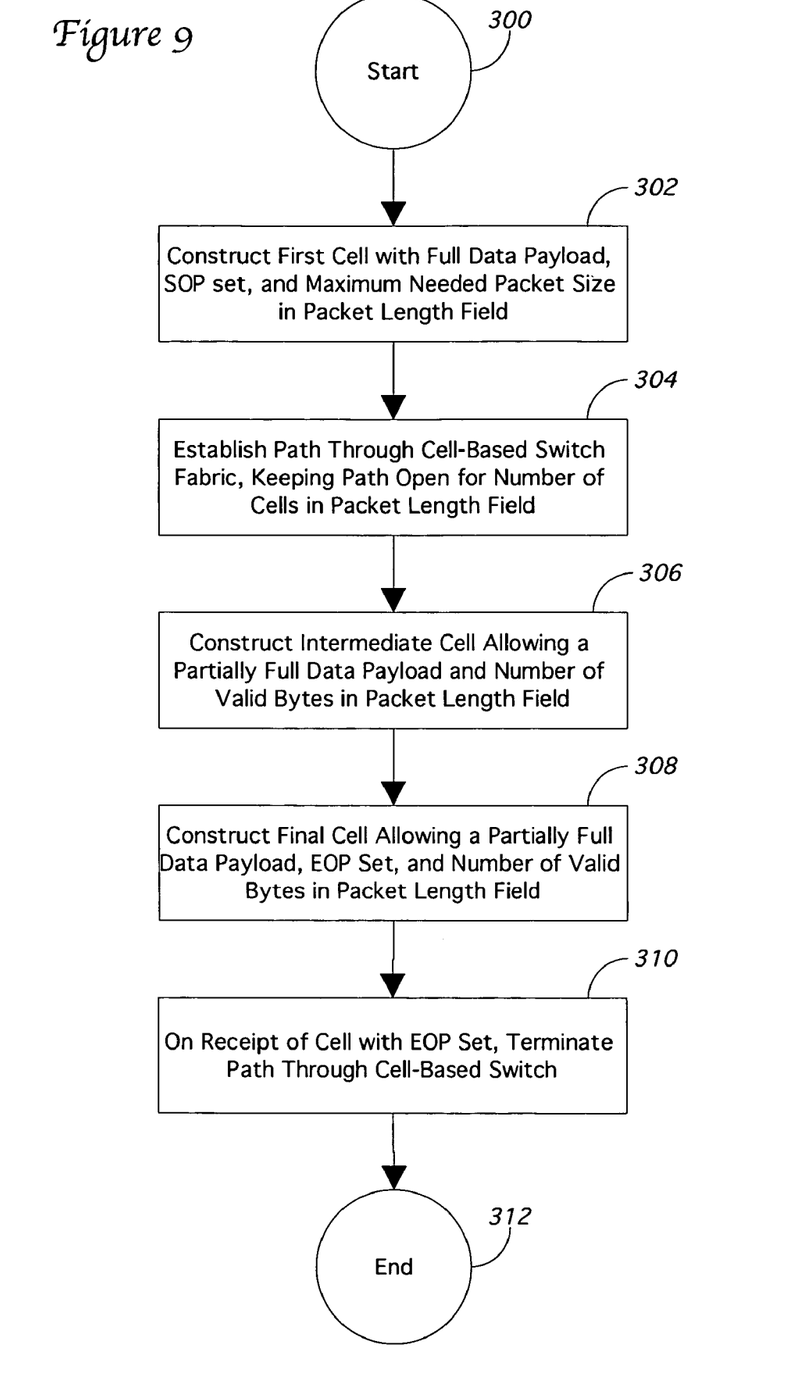
FIG. 9 is a flow chart showing one embodiment of the method used by the present invention.

The procedure used by the present invention to send a variable-length Fibre Channel frame 10 over a cell-based switch fabric is shown as flow chart 300 in FIG. 9. The procedure starts with step 302, in which a first data cell 202 is constructed from the Fibre Channel frame 10. This cell 202 has the SOP 222 flag set, indicates the maximum number of cells needed to transmit a frame in the length of packet field 226, and contains a full data payload 210.

In step 304, a path is established through the cell-based crossbar 140. This path will normally be kept open until the number of cells indicated in field 226 has passed through the crossbar 140. This path need not be created before the intermediate cells 204 and the final cells 206 are constructed (steps 306, 308), although flow chart 300 correctly indicates that this may be true.

In step 306, the intermediate cells 204 are constructed. In these cells 204, neither SOP 222 nor EOP 224 is set, and the data payload may be only partially filled with valid data. In these cells 204, the packet length field 226 indicates the number of valid data bytes in the cell 204. Step 308 then creates the final cell 206, with the EOP flag 224 set and with the packet length field 226 again indicating the number of valid data bytes in the cell 206. It is not necessary that the intermediate cells 204 be created. The size of the Fibre Channel frame 10 may be such that only two cells 202, 206 are necessary. In this case, step 306 may be skipped.

In step 310, the receipt of the final cell on the destination port side of the cell-based crossbar 140 triggers the termination of the path established in step 304. This path is terminated even though the number of cells specified in the length of packet field in step 302 may not have passed through the crossbar.

The present invention is not to be limited to all of the above details, as modifications and variations may be made without departing from the intent or scope of the invention. Those skilled in the art will appreciate that the basic conception of this invention may be utilized for designing future electronic products including new communication devices and switches. Consequently, the invention should not be limited by the specifics of the above description, but rather be limited only by the following claims and equivalent constructions.

What is claimed is:

1. A method for adapting to different data rates between a source for a Fibre Channel frame and a cell-based switch fabric requiring cells having a data payload and a cell header, the cell header containing a packet length field that indicates the length of the Fibre Channel frame in cells, the method comprising:
    a) constructing a first data cell from the Fibre Channel frame, the first data cell containing a full data payload and a packet length value in the packet length field, the packet length value being set large enough to represent a maximum sized Fibre Channel frame;

b) after constructing the first data cell, establishing a path through the cell-based switch fabric and associating with the path a duration determined by the packet length value;
c) constructing a second data cell from the Fibre Channel frame, the second data cell containing a partially filled data payload and a valid data value in the packet length field, the valid data value indicating the number of valid data bytes in the partially filled data payload;
d) transmitting the first and second data cells over the path; and
e) reconstructing the Fibre Channel frame at least in part from the transmitted first and second data cells, the reconstructed data frame containing data from the entire full data payload of the first data cell and the valid data bytes of the second data cell data payload.

2. The method of claim 1, wherein the Fibre Channel frame is received at the source from a Fibre Channel port, and wherein the first data cell is transmitted over the path before the entire Fibre Channel frame is received from the Fibre Channel port.

3. The method of claim 1, further comprising:
f) constructing a third data cell from the Fibre Channel frame, the third data cell containing an end of packet indicator;
g) transmitting the third data cell over the path;
h) detecting the end of packet indicator in the transmitted third data cell; and
i) terminating the path through the cell-based switch fabric after detecting the end of packet indicator, even though the duration has not completed.

4. A method for adapting to different data rates between a source for a data frame and a cell-based switch fabric, the switch fabric requiring cells having a data payload and a packet length field, the method comprising:
a) constructing a first data cell from the data frame, the first data cell containing a full data payload and a packet length value in the packet length field, the packet length value being indicative of the maximum number of data cells in the data frame; wherein the data frame is a variable-length dataframe and
b) constructing a second data cell from the data frame, the second data cell containing a partially filled data payload and a valid data value in the packet length field, the valid data value being indicative of the amount of valid data in the data payload.

5. The method of claim 4, wherein the data frame is a Fibre Channel frame.

6. The method of claim 4, wherein the valid data value is equal to the number of valid data bytes in the partially filled data payload.

7. The method of claim 4, further comprising
c) transmitting the first and second data cell through the cell-based switch fabric; and
d) reconstructing the data frame from the transmitted first and second data cells, the reconstructed data frame containing data from the entire full data payload of the first data cell and that portion of the partially filled data payload of the second data cell that contains valid data as indicated by the valid data value.

8. The method of claim 7, wherein the step of transmitting the first and second data cells through the cell-based switch fabric includes the following steps:
i) establishing a path through the cell-based switch fabric; and
ii) establishing a duration for maintaining the path, the duration being determined by the packet length value in the first data cell.

9. The method of claim 4, wherein the cells have a cell header, and further wherein the packet length field is located in the cell header.

10. The method of claim 4, wherein the packet length field is located in the data payload.

11. The method of claim 4, wherein the packet length field indicates the length of the packet in number of cells.

12. The method of claim 4, further comprising:
c) establishing a path through the cell-based switch fabric; and
d) establishing a duration for maintaining the path, the duration being determined by the packet length value in the first data cell.

13. The method of claim 12, further comprising:
e) constructing a third data cell from the data frame, the third data cell containing an end of packet indicator.

14. The method of claim 13, wherein the cells have a cell header, and further wherein the end of packet indicator and the packet length field are in the cell header.

15. The method of claim 13, further comprising:
f) receiving the third data cell on a destination port side of the cell-based switch fabric;
g) detecting the end of packet indicator; and
h) terminating the path through the cell-based switch fabric after detecting the end of packet indicator, even though the duration has not completed.

16. The method of claim 15, wherein the packet length field indicates the length of the packet in cells and the duration is set to allow a number of cells through the path equal to the packet length value in the first data cell.

17. The method of claim 16, wherein the data frames have a variable length, and the packet length value is equal to a number sufficient to allow a maximum sized data frame to pass through the path.

18. The method of claim 13, wherein the third data cell contains a partially filled data payload and a valid data value in the packet length field.

19. A switch comprising:
a) a source for a Fibre Channel frame;
b) a cell-based switch fabric requiring cells having a data payload and a cell header, the cell header containing a packet length field that indicates the length of the Fibre Channel frame in cells;
c) means for constructing a first data cell from the Fibre Channel frame, the first data cell containing a full data payload and a packet length value in the packet length field, the packet length value being set large enough to represent a maximum sized Fibre Channel frame;
d) means for establishing a path through the cell based switch fabric and associating with the path a duration determined by the packet length value;
e) means for constructing a second data cell from the Fibre Channel frame, the second data cell containing a partially filled data payload and a valid data value in the packet length field, the valid data value indicating the number of valid data bytes in the partially filled data payload;
f) means for reconstructing the Fibre Channel frame at least in part from the transmitted first and second data cells, the reconstructed data frame containing data from the entire full data payload of the first data cell and the valid data bytes of the second data cell data payload.

20. A switch comprising:
a) an input port for receiving a Fibre Channel frame;
b) an input interface module in data communication with the input port, the input interface module segmenting the Fibre Channel frame into fixed-size data cells, the data cells each having a cell data payload and a cell header having a packet length field, the interface module containing logic for
   i) constructing a first data cell from the Fibre Channel frame containing a data payload filled with data from the Fibre Channel frame and a value in the packet length field set large enough to represent a maximum sized Fibre Channel frame, and
   ii) constructing a second data cell from the Fibre Channel frame, the second data cell containing a partially filled data payload and a valid data value in the packet length field;
c) a cell-based crossbar in data communication with the input interface module, the crossbar capable of creating paths through the crossbar for data cells, the paths being maintained through the transmission multiple data cells comprising a data packet, the size of the data packet being determined by the packet length field in the first data cell;
d) an egress interface module in data communication with the crossbar, the egress interface module having logic to reconstruct the Fibre Channel frame from the first and second data cells received from the crossbar; and
e) an output port in data communication with the egress interface module.

21. The switch of claim 20, wherein the first data cell is submitted to the crossbar before the entire Fibre Channel frame is received at the input port.

* * * * *